United States Patent Office 2,937,189
Patented May 17, 1960

2,937,189

PRODUCTION OF PYROMELLITIC DIANHYDRIDE

Walter B. Hoffman, Woodbury, N.J., assignor to E. I. du Pont de Nemours and Company, Wilmington, Del., a corporation of Delaware No Drawing. Application November 12, 1957
Serial No. 695,483

6 Claims. (Cl. 260—346.3)

The present invention relates to a novel process for the preparation of pyromellitic dianhydride. More particularly, the present invention relates to a novel process for the preparation of high-purity pyromellitic dianhydride from pyromellitic acid obtained by the nitric acid oxidation of durene.

Heretofore, pyromellitic dianhydride, a valuable compound finding widespread use as an ingredient of epoxy resin formulations, has been prepared by acetic anhydride dehydration of the acid or by pyrolysis of the molten acid at high temperatures, i.e. at temperatures of about 290–300° C. Although the former method is satisfactory in so far as the results thereby obtained, industrial use of this method is generally unfeasible, on an economic basis, because of the expense of the reagent itself and also of the equipment and procedures required for its recovery. Less satisfactory results are obtained when the pyrolysis method is used. Often, because of the high temperatures employed, the resultant pyromellitic dianhydride is badly charred and essentially worthless without further purification. Furthermore, complicated and expensive equipment is required for the handling of the acid in the molten form. Obviously, an improved method is needed for the preparation of pyromellitic dianhydride.

Accordingly, an object of the present invention is the provision of a simplified method for the preparation of pyromellitic dianhydride. Another object of the present invention is the provision of a method whereby high-purity pyromellitic dianhydride may be obtained from pyromellitic acid in an economical manner. A further object of the present invention is the provision of a method for the conversion of pyromellitic acid to its dianhydride, whereby charring of the material is obviated. Other objects will become apparent as the invention is further described.

I have found that the foregoing objects may be achieved when I heat pyromellitic acid in the solid state at a temperature within the range of 170° C. and the melting point of the acid, i.e. about 265° C., while the water vapor is removed from the heating zone.

In accordance with the process of the present invention, the pyromellitic acid, prior to the afore-described solid-state dehydration, may, if desired, be preliminarily purified by treatment with activated carbon to remove any organic impurities which may be present and then, if desired, with a metal-extracting agent, e.g. a cation-exchange resin, to remove any metals which may be present.

The following examples are presented to illustrate specific embodiments of the process of the present invention. However, they will be understood to be illustrative only and not as limiting the invention in any manner. Unless otherwise designated, the parts in the examples are parts by weight.

*Example 1*

Water-wet crude pyromellitic acid (500 parts) prepared by nitric acid oxidation of durene was dissolved in 1000 parts of water heated to 100° C. Ten parts of activated carbon ("Norit" LI commercially available from the American Norit Co.) was added to the solution, and the mixture was agitated at reflux for 1 hour. Then, the mixture, while hot, was filtered, a filter aid being used to assist in the removal of the carbon. The hot filtrate was passed through a steam-heated column containing a cation-exchange resin ("Amberlite" IR-120, a polystyrene sulfonic acid, commercially available from the Rohm and Haas Co.), and the effluent from the column was cooled to 10° C. The pyromellitic acid was filtered from the cool effluent and then washed with water. The pyromellitic acid dried overnight at 110° C., and the dry cake was crushed. The granular material then was charged to a rotary vacuum flask submerged in an oil bath, and the material was heated for 1½ hours at 230° C. and a pressure of 80 mm. The resultant pyromellitic dianhydride, which was of 98% purity, the pyromellitic acid content being 2%, was obtained in the form of white, free-flowing granules.

*Example 2*

The following table sets forth the results obtained when the acid was dehydrated to the dianhydride under various conditions:

| Run | Heating Means | Temp. (° C.) | Pressure (mm.) | Time | Analysis of Product | |
|---|---|---|---|---|---|---|
| | | | | | Percent PMDA | Percent PMA |
| A | Electric oven | 175 | 10 | 96 hrs | 99.18 | 0.40 |
| B | Band heater on reactor, flow of hot air through material. | 210–215 | atm. | 87 min | 99.6 | 0.1 |
| C | Heating mantle surrounding reactor. | 227–257 | 25–35 | 3.5 hrs | 99.53 | 0.30 |

PMA: Pyromellitic acid; PMDA: Pyromellitic dianhydride.

As may be seen by reference to the foregoing examples, pyromellitic acid is dehydrated substantially completely to its dianhydride by heating the solid acid at temperatures within the range of 170° C. and the melting point of the acid. Surprisingly, in contrast to the prior art methods which require very high temperatures and the use of molten material, I have found that the acid may be dehydrated in the solid state and at much lower temperatures in accordance with the process of the present invention. The advantages of such low-temperature treatment are obvious. Firstly, the treatment of the material in the solid state eliminates the complicated equipment and techniques necessary for the handling of molten material maintained at high temperatures. Secondly, the employment of the low temperatures reduces to a minimum the extent of charring which may occur. Thirdly, the pyromellitic dianhydride is obtained in a granular free-flowing form and thereby may be used directly without further treatment, e.g. granulation.

In order to prevent the recombination of the water evolved in the reaction with the dianhydride formed, the partial pressure of the water vapor must be maintained below equilibrium. Therefore, the water vapor evolved is removed from the heating zone during the reaction. Any one of the conventional methods used to effect such removal may be employed in the process of the present invention. For example, the material may be kept under vacuum during the heating, as illustrated in Example 1 and runs A and C of Example 2. Alternatively, hot air or an inert gas, e.g. nitrogen, may be passed through the heating zone to entrain the water vapor, as illustrated in run B of Example 2.

As has been stated, the heating is effected at temperatures within the range of 170° C. and the melting point of the acid. Although satisfactory results are obtained at all temperatures within this range, the use of the lower temperatures, i.e., 170° to about 200° C., requires longer heating periods. Since the heating time varies inversely with the temperature applied, the use of the higher temperatures within this range is preferable in order to decrease the reaction duration.

Although the solid-state dehydration may be applied directly to crude pyromellitic acid obtained by nitric acid or air oxidation of durene or by any other process, preliminary treatment of the acid with activated carbon and/or the metal-extracting agent is preferable, especially when applied to nitric acid process pyromellitic acid, inasmuch as the resultant pyromellitic dianhydride is of improved color because the pretreatment removes any color-forming substances which may be present in very slight amounts.

The exact procedures used in the pretreatment are not critical, being the well-known techniques of the art. For example, the acid may be dissolved in a suitable solvent, e.g. an alcohol or hot water, and the solution may be agitated or refluxed with the activated carbon, which thereafter may be removed by filtration. Then, if desired, the solution may be contacted with the metal-extracting agent which is nonreactive with the acid, e.g. a cation-exchange resin. After the latter treatment, the acid is separated from solution, for example, by evaporation of the solvent or by crystallizing out the acid. The solid pyromellitic acid then is dried and crushed prior to the solid-state dehydration.

Although the process has been illustrated as a batchwise process, equally feasible is the carrying out of the process in a continuous manner. The solid-state dehydration step may be effected continuously, either alone or in combination with the pretreatment procedures. For example, the crude pyromellitic acid may be charged continuously either directly to the heating zone from which the dianhydride is continuously removed or may first be charged continuously to the pretreatment zone and from thence to the heating zone.

The invention has been described in detail in the foregoing. However, it will be obvious to those skilled in the art that many variations are possible without departure from the scope of the invention. I intend, therefore, to be limited only by the following claims.

I claim:

1. An improved process for the preparation of pyromellitic dianhydride which comprises heating pyromellitic acid in the solid state at a temperature within the range of 170° C. and the melting point of the said acid while maintaining the temperature within the said range and while removing water vapor from the heating zone until at least 98% by weight of the said pyromellitic acid is converted to pyromellitic dianhydride.

2. A process for the preparation of pyromellitic dianhydride of high purity which comprises treating a solution of crude pyromellitic acid with activated carbon, removing the activated carbon, separating out the carbon-treated pyromellitic acid, and thereafter heating the pyromellitic acid in the solid state while maintaining the temperature within the range of 170° C. and the melting point of the acid and while removing water vapor from the heating zone until at least 98% by weight of the pyromellitic acid is converted to pyromellitic dianhydride.

3. A process for the prepartion of high-purity pyromellitic dianhydride which comprises treating a solution of crude pyromellitic acid with activated carbon, removing the activated carbon, contacting the free solution with a metal extracting agent nonreactive with the acid, thereafter separating out the pyromellitic acid, and heating the pyromellitic acid in the solid state while maintaining the temperature within the range of 170° C. and the melting point of the acid while removing water vapor from the reaction zone until at least 98% by weight of the pyromellitic acid is converted to pyromellitic dianhydride.

4. A process according to claim 3, wherein the metal-extracting agent is a cation-exchange resin.

5. A process according to claim 3, wherein the heating is carried out under reduced pressure.

6. A process according to claim 3, wherein the heating is carried out under the flow of hot air.

References Cited in the file of this patent

UNITED STATES PATENTS

| | | |
|---|---|---|
| 2,576,625 | Miller | Nov. 27, 1951 |
| 2,578,326 | Toland | Dec. 11, 1951 |

OTHER REFERENCES

Schroeter: Ber. Deut. Chem. Gesell, vol. 57, p. 2023 (1924).

Philippi et al.: Monatshefte für Chemie, vol. 43, p. 617 (1922).